(12) United States Patent
Park

(10) Patent No.: US 12,547,033 B2
(45) Date of Patent: Feb. 10, 2026

(54) WAVELENGTH-TUNABLE LIQUID CRYSTAL ETALON FILTER, LIGHT SOURCE AND OPTICAL TRANSCEIVER INCLUDING THE SAME

(71) Applicant: ALBATRACE, INC., Suwon-si (KR)

(72) Inventor: Sang Hyun Park, Cheonan-si (KR)

(*) Notice: Subject to any disclaimer, the term of this patent is extended or adjusted under 35 U.S.C. 154(b) by 0 days.

(21) Appl. No.: 18/674,844

(22) Filed: May 25, 2024

(65) Prior Publication Data

US 2024/0310680 A1  Sep. 19, 2024

Related U.S. Application Data

(63) Continuation of application No. 18/129,830, filed on Apr. 1, 2023, now Pat. No. 12,044,937.

(30) Foreign Application Priority Data

Apr. 8, 2022 (KR) .................. 10-2022-0044081

(51) Int. Cl.
| | | |
|---|---|---|
| *G02F 1/1343* | (2006.01) | |
| *G02B 5/28* | (2006.01) | |
| *G02F 1/1335* | (2006.01) | |
| *G02F 1/1337* | (2006.01) | |

(52) U.S. Cl.
CPC ......... *G02F 1/13439* (2013.01); *G02B 5/284* (2013.01); *G02F 1/133509* (2013.01); *G02F 1/1337* (2013.01); *G02B 2207/107* (2013.01); *G02F 2203/055* (2013.01)

(58) Field of Classification Search
None
See application file for complete search history.

(56) References Cited

U.S. PATENT DOCUMENTS

| | | | | |
|---|---|---|---|---|
| 5,592,314 A | * | 1/1997 | Ogasawara | G02F 1/13473 356/519 |
| 6,545,739 B1 | * | 4/2003 | Matsumoto | G02B 6/29358 349/198 |
| 9,207,516 B1 | * | 12/2015 | Yu | G02F 1/216 |
| 2018/0017824 A1 | * | 1/2018 | Song | H01S 5/141 |
| 2022/0113570 A1 | * | 4/2022 | Song | G02F 1/133553 |

FOREIGN PATENT DOCUMENTS

| | | |
|---|---|---|
| JP | S58-79218 | 5/1983 |
| JP | S58-80667 | 5/1983 |
| JP | 2000-47224 A | 2/2000 |

(Continued)

OTHER PUBLICATIONS

English Specification of JP2000-298270A.

(Continued)

*Primary Examiner* — Ryan Crockett

(74) *Attorney, Agent, or Firm* — ANTONIO HA & U.S. PATENT, LLC

(57) ABSTRACT

Provided is a subminiature wavelength tunable liquid crystal etalon filter capable of minimizing damage during manufacturing, a light source and an optical transceiver including the same. According to one aspect of the present embodiment, a wavelength tunable liquid crystal etalon filter capable of minimizing damage that may be applied to a seal line during a curing process and a light source and an optical transceiver including the same are provided.

18 Claims, 19 Drawing Sheets

(56) References Cited

FOREIGN PATENT DOCUMENTS

| | | |
|---|---|---|
| JP | 2000-298270 A | 10/2000 |
| JP | 3221889 | 10/2001 |
| JP | 2003-222844 A | 8/2003 |
| JP | 2004-61706 A | 2/2004 |
| JP | 2005-134905 A | 5/2005 |
| JP | 2006-251431 A | 9/2006 |

OTHER PUBLICATIONS

English Specification of JP3221889.
English Specification of JP2000-47224A.
English Specification of JP2005-134905A.
English Specification of JPS58-79218.
English Specification of JP2003-222844A.
English Specification of JP2006-251431A.
English Specification of JPS58-80667.
English Specification of JP2004-61706A.

* cited by examiner

WAVELENGTH-TUNABLE LIQUID CRYSTAL ETALON FILTER, LIGHT SOURCE AND OPTICAL TRANSCEIVER INCLUDING THE SAME

CROSS-REFERENCE TO RELATED APPLICATION(S)

This application is a continuation of U.S. patent application Ser. No. 18/129,830, filed on Apr. 1, 2023, which claims priority to Korean Patent Application No. 10-2022-0044081 filed in the Korean Intellectual Property Office on Apr. 8, 2022, the disclosures of which are incorporated by reference herein in its entirety.

TECHNICAL FIELD

This embodiment relates to a wavelength tunable liquid crystal etalon filter capable of minimizing damage during manufacturing, a light source and an optical transceiver including the same.

DISCUSSION OF RELATED ART

The contents described in this section merely provide background information on the present embodiment and do not constitute prior art.

Etalon is an optical element that transmits only light of a specific wavelength by interference. The etalon has two substrates including reflectors mounted close together and in parallel. The etalon allows only light at a specific wavelength to be transmitted through interference caused by the multi-reflection of light from two parallel mirror surfaces. The etalon is an optical element implemented as a filter and widely used in optical communication, and it has the advantages of high efficiency and high wavelength selectivity. In particular, the etalon filter may also be used in a wavelength tunable semiconductor laser device including an external cavity.

In this case, the etalon may include a liquid crystal layer inside the cavity. When the applied voltage is changed, the refractive index of the liquid crystal layer changes. Accordingly, the etalon can electrically modulate the wavelength of transmitted light. This is called a liquid crystal etalon filter.

However, as the external environment such as pressure or temperature changes, the thickness of the liquid crystal layer in the conventional etalon filter changes as well. A change in the liquid crystal thickness directly affects the transmission wavelength of the etalon filter, causing deterioration in the performance of the etalon filter. In particular, the insertion loss of the etalon is significantly affected by the parallelism of the two substrates. The change in the volume of the liquid crystal deteriorates the parallelism of the two substrates and the insertion loss, too.

Liquid crystal display (LCD) using liquid crystals may also change in volume of liquid crystals depending on the operating temperature, but the effect of volume changes in liquid crystals on product properties is different from that of etalon filters. LCD uses liquid crystal to control the intensity of output light, not the wavelength of output light. For this reason, even if the thickness of the liquid crystal layer is finely changed, the intensity of the output light is only slightly changed, but no significant change occurs in the image quality. Further, since the LCD has the area of several $cm^2$ to tens of thousands of $cm^2$, the effect caused by a change in the volume of the liquid crystal is relatively insensitive. Further, in the LCD, a space filled with liquid crystal is fixed with a spacer, and the cellgap between two substrates can be adjusted using the spacer, so that the liquid crystal is relatively insensitive to an increase in volume or a change in properties. On the other hand, unlike LCD, the etalon filter has a small area of less than 0.1 $cm^2$ containing liquid crystal, so it is sensitively affected by the increase in the volume of liquid crystal. Further, due to its size, components such as spacers cannot be included, so it is significantly affected by changes in the properties or size of liquid crystals.

Accordingly, there is a demand for a liquid crystal etalon filter to have properties that are robust to changes in the external environment.

Further, in the process of manufacturing a device including a wavelength control type etalon filter, light of a UV wavelength band or the like is irradiated to cure various materials. In this case, the light of the corresponding wavelength band causes damage to components in the wavelength tunable etalon filter, particularly, liquid crystal. Accordingly, insertion loss may occur due to changes in the external environment.

SUMMARY

An object of one embodiment of the present disclosure is to provide a wavelength tunable liquid crystal etalon filter that is robust to changes in the external environment, a light source and an optical transceiver including the same.

Another object of one embodiment of the present disclosure is to provide a wavelength tunable liquid crystal etalon filter that can minimize damage that may be applied to a seal line during a curing process, a light source and an optical transceiver including the same.

An aspect of the present disclosure provides a wavelength tunable etalon filter through which only incident light with a predetermined wavelength band is transmitted among incident light, a pair of substrates, liquid crystal configured to be injected between the pair of substrates, a pair of transparent electrodes, each transparent electrode being disposed on one surface of each substrate in a direction facing each other to receive power from the outside, thereby forming an electric field, a pair of high reflection layers, each layer being disposed on one surface of each transparent electrode or each substrate in a direction facing each other to reflect light incident toward the transparent electrode, a pair of alignment layer configured to be disposed on the high reflection layer to orient the liquid crystal, a seal line configured to be formed between the pair of substrates to maintain a gap between the pair of substrates or the pair of high reflection layers, a metal electrode configured to be positioned between the substrate and the seal line, made of a material that does not transmit light and including a transmission hole so that light for filtering or filtered light is passed through the transmission hole and light with a wavelength band which is able to damage the liquid crystal and the seal line is blocked, and an encapsulant configured to be sealed to prevent discharge of the liquid crystal.

According to an embodiment of the present disclosure, the metal electrode is disposed on the high reflection layer.

According to an embodiment of the present disclosure, the metal electrode is disposed between the substrate and the high reflection layer.

According to an embodiment of the present disclosure, the transparent electrode is disposed on the high reflection layer.

According to an embodiment of the present disclosure, the metal electrode is disposed between the transparent electrode and the high reflection layer.

According to an embodiment of the present disclosure, the metal electrode is disposed on the transparent layer.

According to an embodiment of the present disclosure, the metal electrode blocks light with a UV wavelength band.

According to an embodiment of the present disclosure, the seal line includes an internal seal line configured to be formed between the pair of substrates to maintain a gap between the pair of substrates or the pair of high reflection layers, have an inlet space having a main inlet through which the liquid crystal is introduced and a sub inlet through which the liquid crystal is discharged and include a main accommodating space configured to have a predetermined shape around the area L through which light is incident or passed.

According to an embodiment of the present disclosure, the seal line includes an external seal line configured to be formed between the pair of substrates, have a predetermined shape, and is positioned outside the internal seal line to form a sub accommodating space outside the internal seal line.

As described above, according to one aspect of the present embodiment, the tunable liquid crystal etalon filter has an advantage of minimizing performance degradation due to changes in the external environment.

According to one aspect of the present embodiment, damage that may be applied to the seal line during a curing process can be minimized, while the wavelength tunable liquid crystal etalon filter is installed in a device such as a light source or an optical transceiver.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF EXEMPLARY EMBODIMENTS

Figure 1:
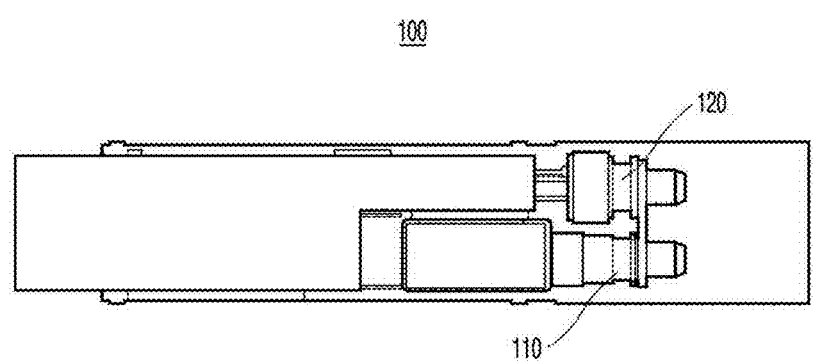
FIG. 1 is a view showing the configuration of an optical transceiver according to the present disclosure.

Since the present disclosure can make various changes and have various embodiments, specific embodiments will be illustrated in the drawings and described in detail. However, this is not intended to limit the present disclosure to specific embodiments, and it should be understood that it includes all modifications, equivalents or substitutes included in the spirit and scope of the present disclosure. Like reference numerals have been used for like elements throughout the description of each figure.

Terms such as first, second, A, and B may be used to describe various components, but the components should not be limited by the terms. These terms are only used for the purpose of distinguishing one component from another. For example, a first element may be termed a second element, and similarly, a second element may be termed a first element, without departing from the scope of the present disclosure. The terms and/or include any combination of a plurality of related recited items or any of a plurality of related recited items.

It is understood that when an element is referred to as being "connected" or "coupled" to another element, it may be directly connected or coupled to the other element, but other elements may exist in the middle. On the other hand, when an element is referred to as "directly connected" or "directly connected" to another element, it should be understood that no intervening element exists.

Terms used in this application are only used to describe specific embodiments and are not intended to limit the present disclosure. Singular expressions include plural expressions unless the context clearly dictates otherwise. It should be understood that terms such as "include" or "have" in this application do not preliminarily exclude the presence or addition of features, numbers, steps, operations, components, parts, or combinations thereof described in the specification.

Unless defined otherwise, all terms used herein, including technical or scientific terms, have the same meaning as commonly understood by one of ordinary skill in the art to which the present disclosure belongs.

Terms such as those defined in commonly used dictionaries should be interpreted as having a meaning consistent with the meaning in the context of the related art, and unless explicitly defined in this application, it is not to be construed in an ideal or overly formal sense.

Further, each configuration, step, process or method included in each embodiment of the present disclosure may be shared within a range that does not contradict each other technically.

FIG. 1 is a view showing the configuration of an optical transceiver according to the present disclosure.

Referring to FIG. 1, an optical transceiver 100 according to an embodiment of the present disclosure includes a transmitter 110, a receiver 120, and a controller (not shown).

The optical transceiver 100 is a module that converts an electrical signal into an optical signal and transmits it through a medium such as an optical fiber and that receives an optical signal transmitted (from the outside) and converts it back into an electrical signal in an optical communication device such as an optical transmission system, a high-capacity router or a switch. The optical transceiver 100 may perform both optical transmission and optical reception functions by itself.

The optical transceiver 100 is installed as a component in a communication device of various optical communication systems such as 5G to output an optical signal of a predetermined wavelength band or receive only light of a predetermined wavelength band. In particular, the optical transceiver 100 may be installed in a communication device requiring fine adjustment of a wavelength band, such as a wavelength division multiplex (WDM), to output or receive light by finely adjusting the wavelength band.

The transmitter 110 outputs information loaded in laser light of a predetermined wavelength band.

The transmitter 110 includes a light source 200 (to be described later with reference to FIG. 2) that outputs laser light in a predetermined wavelength band and a driver (not shown) that controls the operation (on/off) of the light source 200. The light source 200 outputs light in a predetermined wavelength band under the control of the controller and the driver, and the driver) controls the operation (on/off) of the light source 200 under the control of a controller.

The receiver 120 receives the laser light output from the outside.

The receiver 120 includes a wavelength tunable etalon filter 230 (described later with reference to FIG. 2) and a light receiving unit (not shown). The receiver 120 may receive various noise lights as well as information-loaded light output from an external optical transceiver. Accordingly, the wavelength tunable etalon filter 230 is disposed of in front of the light receiving unit in a direction where light is incident to the light receiving unit and filters noise light excluding laser light of a predetermined wavelength band. Accordingly, only light loaded with information may be incident to the light receiving unit. The light receiving unit converts the received optical signal into an electrical signal. The control unit receives the electrical signal converted from the light receiving unit and identifies information contained in the received optical signal.

The controller controls the operations of the transmitter 110 and the receiver 120.

Figure 2:
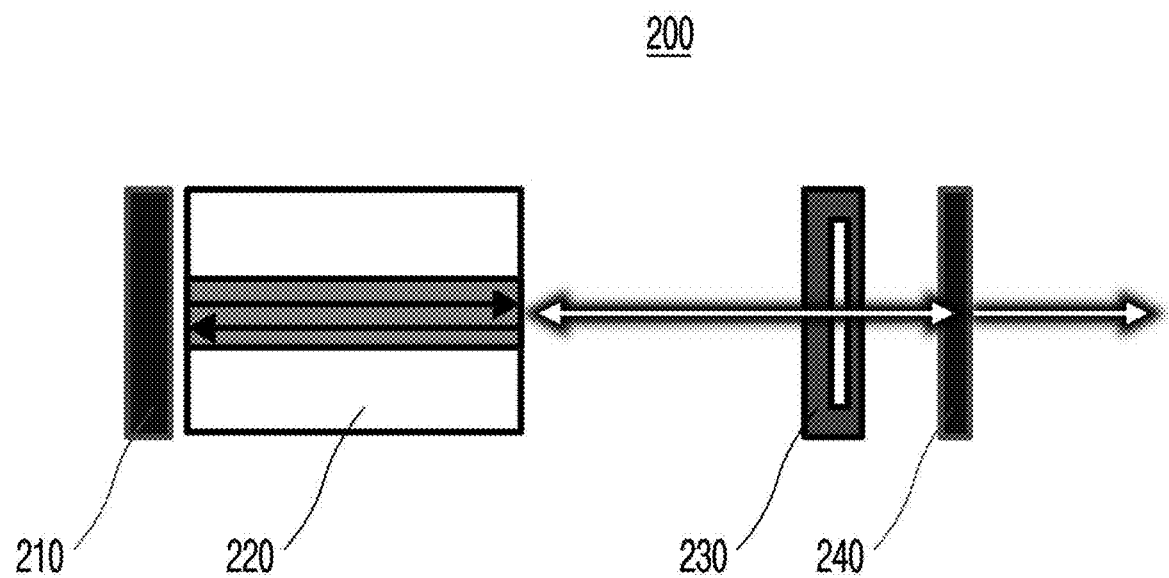
FIG. 2 is a view showing the configuration of a light source according to the present disclosure.

FIG. 2 is a view showing the configuration of a light source according to the present disclosure.

Referring to FIG. 2, a light source 200 according to an embodiment of the present disclosure includes a first mirror 210, a gain medium 220, a wavelength tunable etalon filter 230, (hereinafter abbreviated as an 'etalon filter'), and a second mirror 240. The light source 200 may further include a fixed etalon filter (not shown).

The gain medium 220 receives power from the outside, outputs light, and amplifies light passing through itself.

The first mirror 210 and the second mirror 240 are disposed of to face each other with the gain medium 220 and the etalon filter 230 interposed therebetween, and reflect light emitted from the gain medium 220. The light output from the gain medium 220 is reflected by the first mirror 210 and the second mirror 240 and continuously passes through the gain medium 220. A cavity is formed between mirrors 210 and 240. As the cavity is formed, the light output from the gain medium 220 is laser resonated and output in the direction of the second mirror 240 with a relatively low reflectivity.

The etalon filter 230 transmits only light in a predetermined wavelength band among incident light. As described above, the etalon filter 230 multi-reflects incident light and induces it to interfere, thereby transmitting only light in a predetermined wavelength band. The etalon filter 230 includes a liquid crystal and receives power from the outside to adjust the refractive index, thereby adjusting the wavelength band of the light to be transmitted. Accordingly, the light source 200 may be included in a communication device requiring detailed adjustment of a wavelength band and may adjust the wavelength band of output light as desired.

In this case, the etalon filter 230 structurally includes liquid crystal, but minimizes a change in properties or size of the liquid crystal due to an external environment. Therefore, it is possible to adjust the wavelength band of light passing through it precisely. A detailed structure of the etalon filter 230 is described below with reference to FIG. 3.

The light source 200 may further include a fixed etalon filter. The fixed etalon filter transmits light discretely at every free spectral range (FSR) interval. That is, when passing through the fixed etalon filter, output light discretely has a wavelength band of FSR intervals, and a wavelength band between FSR intervals is filtered by the fixed etalon filter. The fixed etalon filter is disposed between the gain medium 220 and the etalon filter 230 so that light is incident to the fixed etalon filter before the etalon filter 230. As the light of the wavelength band between the FSR intervals among the incident light is filtered by the fixed etalon filter, the etalon filter 230 can more precisely and easily adjust the incident light to a desired wavelength band.

Meanwhile, the light source 200 is included in the light transmitter 110 in the optical transceiver 100, and the etalon filter 230 is described for convenience as being included in the light source 200 and the light receiver 120, but it is not limited thereto. The light source 200 may be included in any device that needs to precisely adjust the wavelength band of the laser light to be output, and the etalon filter 230 is also in any element that needs to precisely adjust the wavelength band of the incident laser light.

Figure 3:
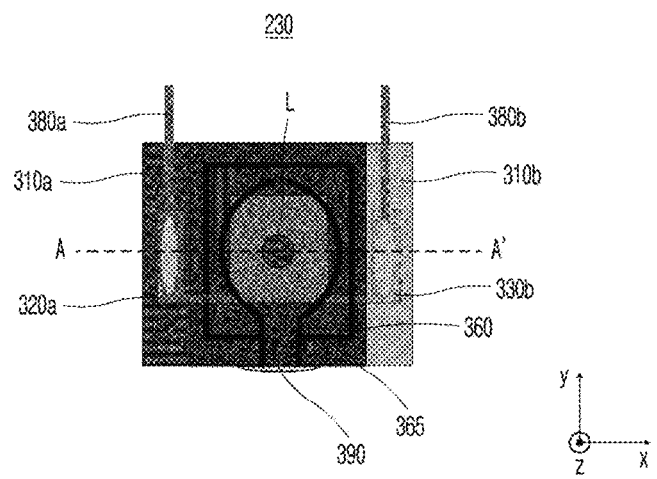
FIG. 3 is a plan view of a wavelength tunable liquid crystal etalon filter according to a first embodiment of the present disclosure.
Figure 4:
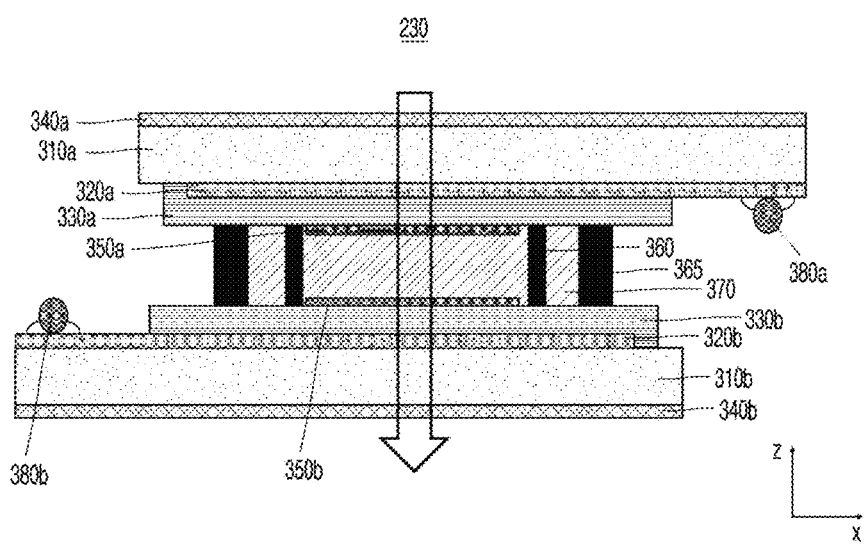
FIG. 4 is a cross-sectional view of a wavelength tunable liquid crystal etalon filter according to a first embodiment of the present disclosure.

FIG. 3 is a plan view of a wavelength tunable liquid crystal etalon filter according to a first embodiment of the present disclosure, FIG. 4 is a cross-sectional view of a wavelength tunable liquid crystal etalon filter according to a first embodiment of the present disclosure, and FIG. 5 is a view illustrating a process of injecting liquid crystal into a wavelength tunable liquid crystal etalon filter according to the present disclosure.

Referring to FIGS. 3, 4, and 5, a wavelength tunable liquid crystal etalon filter (230, hereinafter referred to as a 'first etalon filter') according to a first embodiment of the present disclosure comprises a substrate 310 and a transparent electrode 320. a high reflection layer 330, an antireflection layer 340, an alignment film 350, an inner seal line 360, an external seal line 365, a liquid crystal 370, a wire 380, and an encapsulant 390.

The substrate 310 supports the respective components in the first etalon filter 230. The substrates 310a and 310b are arranged to face each other while being spaced apart by a predetermined distance, so that appropriate components can be disposed on the surface in the facing direction or on the opposite surface thereof. The substrate 310 has a property of transmitting incident laser light or to-be-output laser light, so that incident light or output light can be transmitted.

The transparent electrodes 320 are disposed on surfaces of the substrates 310 facing each other to form an electric field. An electric field is mainly formed between the transparent electrodes 320, and the alignment of the liquid crystal 370 varies according to the strength of the electric field formed through the alignment layer 350. Since a change in orientation of the liquid crystal 370 induces a change in the refractive index of the liquid crystal 370, the transparent electrode 320 induces a change in the wavelength band of to-be-transmitted laser light.

The high reflection layer 330 is disposed on the transparent electrode 320 or on a surface of each substrate 310 facing each other to reflect light incident toward it. The high reflection layers 330 multi-reflect light incident on the first etalon filter 230 therebetween to induce interference. In order to maintain the multi-reflection interference phenomenon in normal quality, the two high reflection layers 330 must be parallel. That is, it is preferable that the distance between the two high reflection layers 330 is constant within the cross section through which the laser beam passes, and that the deviation is maintained within several tens of nm. When the interference proceeds, the only light in a predetermined wavelength band is transmitted according to the refractive index of the space in which the interference occurs and the spacing of the space (In FIG. 4, the interval between the high reflection layers in the z-axis direction). FIG. 2 shows that the high reflection layer 330 is disposed on the transparent electrode 320 but is not necessarily limited thereto. The transparent electrode 320 may be disposed on the high reflection layer 330.

The antireflection layer 340 is disposed on the side opposite to the direction in which each substrate 310 faces each other to minimize reflection of light incident to the first etalon filter 230 or to-be-output light from the first etalon filter 230 due to the substrate. When light is incident, reflection occurs on the surface of the substrate 310 (in particular, the opposite side in the direction in which each substrate 310 faces each other), reducing the amount of light. The antireflection layer 340 is disposed on the corresponding surface of the substrate to minimize reflection of light at the boundary surface of the substrate.

The alignment layer 350 is disposed on the high reflection layer 330 in a direction in which the two substrates 310 face each other to align the liquid crystal 370. The alignment layer 350 is disposed on the high reflection layer 330 in the above-mentioned direction and is formed to the extent that it does not deviate from the external seal line 365. When an electric field is formed by the transparent electrode 320, the alignment layer 350 maintains the liquid crystals adjacent to the alignment layer in the initial alignment direction even though the alignment direction of the liquid crystals is changed in a direction different from the initial alignment direction by the electric field.

The inner seal line 360 and the external seal line 365 are formed between the respective substrates 310 to maintain a gap between the two substrates 310 or the high reflective layer 330, thereby forming a liquid crystal accommodating space. The seal lines 360 and 365 are implemented with a thermoset or photocurable polymer encapsulant and may be formed between the two substrates 310.

The inner seal line 360 has a predetermined width, which is relatively larger than the (predetermined) width of the injection space having the main inlet 510 into which liquid crystal can flow. The inner seal line 360 includes a main accommodating space 530 implemented to have a predetermined shape around the area L through which the laser light is incident or passes. A sub inlet 520 with one portion open is implemented at a predetermined location in the main accommodating space, for example, at a location furthest from the main inlet.

Meanwhile, the external seal line 365 has a predetermined shape and is located outside the internal seal line 365, but contacts one of the injection spaces of the internal seal line 360 to form a closed space. A sub accommodating space 540 is formed outside the inner seal line 360 by the external seal line 365. The external seal line 365 has a predetermined shape for example, a square shape, with one portion open, and one portion that is opened is in contact with one position of the injection space (of the inner seal line 360). As such, the external seal line 365 forms a closed space outside the inner seal line 365 to form the sub accommodating space 540.

Figure 5A:
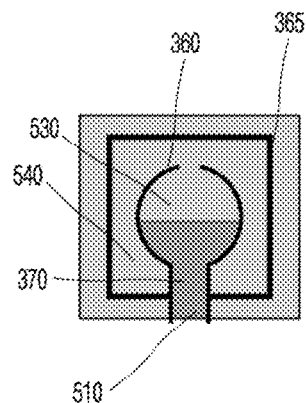
FIGS. 5A, 5B, 5C, 5D, 5E, and 5F are views illustrating a process of injecting liquid crystal into a wavelength tunable liquid crystal etalon filter according to the present disclosure.
Figure 5B:
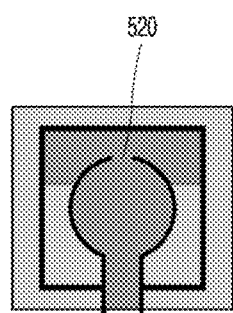
Figure 5C:
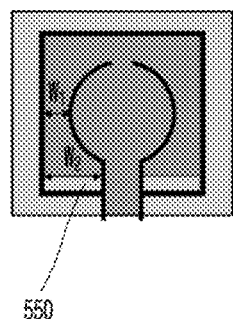

Referring to FIGS. 5A, 5B, and 5C, liquid crystal flows into the main inlet 510 of the inner seal line 360. When the liquid crystal is injected, the liquid crystal is accommodated in the main accommodating space of the inner seal line 360. When the liquid crystal is sufficiently accommodated in the main accommodating space, the liquid crystal starts to be accommodated into the sub accommodating space 540 through the sub inlet 520. Injection of liquid crystal does not proceed until the main accommodating space 530 and the sub accommodating space 540 are filled, but only until the gas accommodating space 550 is formed in the sub accommodating space 540. When the liquid crystal is not injected as much as the entire volume of the main accommodating space 530 and the sub accommodating space 540, the residual gas is pushed out from the sub inlet of the sub accommodating space 540 to the far end by the liquid crystal injection and is located at the corresponding position. As such, the gas accommodation space 550 in which gas is present therein is intentionally formed by adjusting the structure of the inner seal line 360 and the main inlet 510, the spaces they form, and the injection amount of liquid crystal. When gas is present in the liquid crystal 370, the following effects may be obtained. As described above in the background, when the external pressure or temperature changes, the properties or size (volume) of the liquid crystal 370 change. When the main accommodating space 530 and the secondary accommodating space 540 are filled with the liquid crystal 370, as the size (volume) of the liquid crystal 370 increases due to a change in the external environment, the distance between the substrates 310 changes. The substrate 310a and the substrate 310b only have a liquid crystal accommodating space by the seal lines 360 and 365, and the spacing is not fixed. Accordingly, when the size of the liquid crystal 370 is changed, pressure (z-axis direction in FIG. 4) is applied so that the liquid crystal 370 faces outward from the inside of the liquid crystal accommodating space. Accordingly, the distance between the two substrates 310 and the parallelism between the two substrates is changed. This causes a change in the wavelength band of light passing through the first etalon filter 230 and an increase in insertion loss.

On the other hand, when the gas accommodating space 550 is formed, and gas exists in the liquid crystal 370, an increase in the size (volume) of the liquid crystal 370 causes a contraction of the gas accommodating space to minimize a change in pressure within the substrate 310. That is, since the increase in the size (volume) of the liquid crystal 370 mainly applies pressure to the gas to minimize the generation of pressure from the inside of the liquid crystal accommodating space to the outside. Accordingly, even if the properties or size (volume) of the liquid crystal 370 change due to a change in the external environment, only the size (volume) of the gas mainly changes, and the distance between the substrates 310 and the parallelism between the two substrates can be maintained.

However, it is not necessarily limited to the presence of gas in the liquid crystal 370, and a vacuum may exist in the liquid crystal 370. When the liquid crystal is injected into the main inlet 510 in a vacuum state, if liquid crystal is not injected as much as the entire volume of the main accommodation space 530 and the sub accommodation space 540, a vacuum may exist instead of gas in the liquid crystal 370. When the volume of the liquid crystal 370 increases due to a change in external temperature, the liquid crystal 370 is introduced into a vacuum (in the gas receiving space), thereby preventing a change in the distance between the substrates 310 and the parallelism between the two substrates.

The inner seal line 360 and the external seal line 365 may have different thicknesses (length in the x-axis direction in FIG. 4). The external seal line 365 already exists to support and maintain the gap between the substrates 310, and the internal seal line 360 is configured to guide the liquid crystal 370 to first fill the main accommodating space 530 and secondarily fill the sub accommodating space 540. Accordingly, the inner seal line 360 may have a relatively smaller thickness than the external seal line 365. Further, as the thickness of the inner seal line 360 increases, the area L through which light is incident or passed may be affected. Accordingly, the inner seal line 360 may have a relatively smaller thickness than the external seal line 365.

Figure 5D:
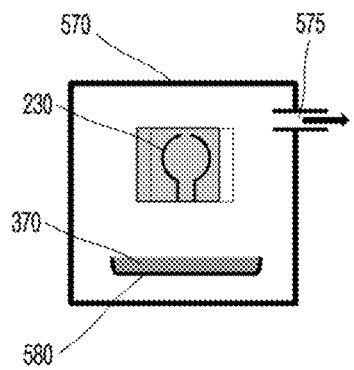
Figure 5E:
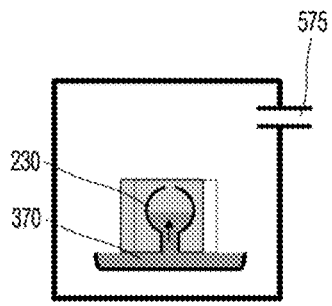
Figure 5F:
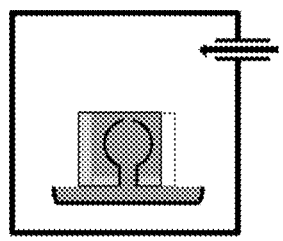

Injection of the liquid crystal 370 into the main accommodating space 530 and the sub accommodating space 540 proceeds as shown in FIGS. 5D, 5E, and 5F.

As shown in FIG. 5D, in order to fill the first etalon filter 230 with the liquid crystal 370, the tray 580 containing the liquid crystal 370 and the first etalon filter 230 are disposed in the chamber 570. Thereafter, the air in the chamber 570 is discharged through the entrance 575, and the chamber 570 is made into a vacuum state.

When the inside of the chamber 570 is in a vacuum state, the first etalon filter 230, in particular, the main inlet is brought into contact with the liquid crystal 370 in the tray 580, as shown in FIG. 5E.

Thereafter, as shown in FIG. 5F, air is injected into the chamber 570 through the entrance 575. Accordingly, the pressure in the chamber 570 increases, and the liquid crystal 370 is injected into the first etalon filter 230.

Referring back to FIGS. 3, 4, 5A, 5B, and 5C, the width of the main accommodating space 530 of the inner seal line 360 is larger than the width of the injection space. Accordingly, as shown in FIG. 5C, the width of the sub accommodating space 365 is not uniform. The distance $W_2$ between the external seal line 365 and the injection space (near the main inlet) is formed to be relatively wide, and the distance $W_1$ between the external seal line 365 and the inner seal line 360 is formed to be relatively narrow. Accordingly, the sub accommodating space 540 has a bottleneck structure when looking at the distance $W_1$ between the external seal line 365 and the inner seal line 360 based on the gas accommodating space 550. Accordingly, the liquid crystal 370 is injected, and gas accommodated in the gas accommodating space 550 can be minimized from moving toward the sub inlet 520 of the sub accommodating space 540 and further into the main accommodating space 530. An area L through which light is incident or passed is located in the main accommodating space 530, and when a gas moves into the main accommodating space 530, incident light or output light is adversely affected. To minimize this, the sub accommodating space 540 has a bottleneck structure, so that the gas accommodated in the gas accommodating space 550 can be minimized from escaping the gas accommodating space 550.

The wire 380 is disposed at one position of the transparent electrode 320 to supply power to the transparent electrode 320.

The encapsulant 390 seals the main accommodating space 530 to prevent the liquid crystal 370 from being discharged. The encapsulant 390 is partially injected into the main accommodating space 530, particularly, the main inlet 510 and hardened, thereby sealing the main inlet 510. The encapsulant 390 seals the main inlet 510 and prevents the liquid crystal 370 from being discharged to the outside of the main accommodating space 530 and the sub accommodating space 540.

As the double seal lines are provided and the two seal lines have the above-described shape, the first etalon filter 230 may provide the following effects.

Since the double seal lines 360 and 365 are provided, the distance between the substrates 310 or between the high reflection layers 330 can be kept as uniform as possible. Since the seal lines 360 and 365 are formed in double, they can be relatively robust against external force than a single seal line. Further, since gas is contained inside the liquid crystal, the seal lines 360 and 365 can maintain a gap even when the properties or size (volume) of the liquid crystal 370 change due to a change in the external environment.

Further, since the seal lines 360 and 365 have the above-described shape, re-introduction of gas included in the liquid crystal into the area L through which light is incident or passed can be prevented as much as possible.

Although FIG. 4 shows that the transparent electrode 320, the high reflection layer 330, and the alignment layer 350 are sequentially disposed on the substrate 310, it is not necessarily limited thereto. The order of layers 320, 330, and 350 on the substrate 310 may be changed.

Figure 6:
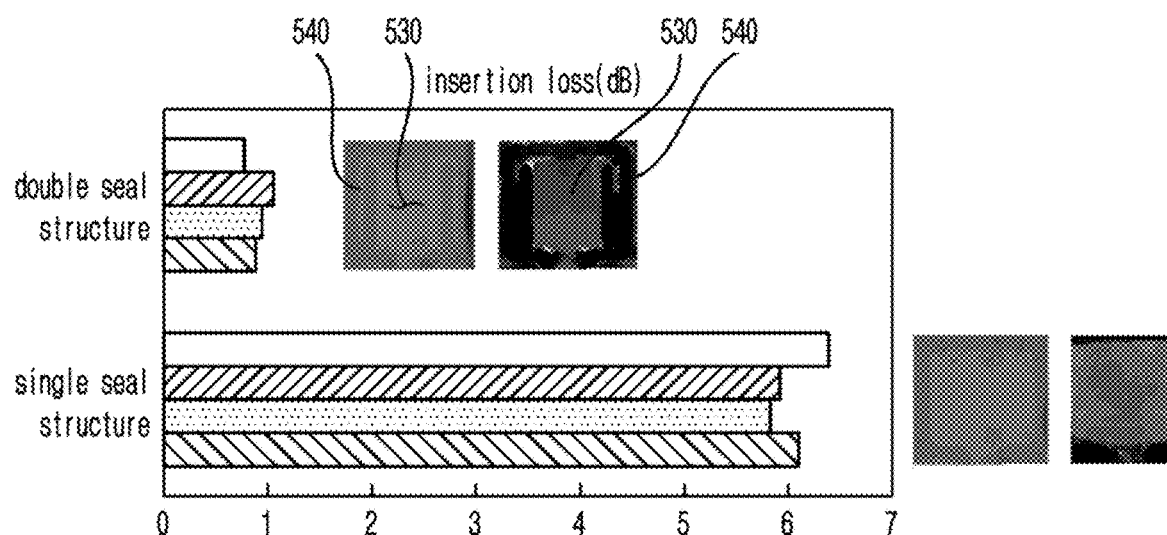
FIG. 6 is a graph showing insertion loss to thermal shock of a wavelength tunable liquid crystal etalon filter and a conventional etalon filter according to the present disclosure.

FIG. 6 is a graph showing insertion loss to thermal shock of a wavelength tunable liquid crystal etalon filter and a conventional etalon filter according to the present disclosure.

Referring to FIG. 6, after heat-treating the conventional etalon filter with a single seal structure and the first etalon filter 230 with a double seal structure at 120° C. for 12 hours followed by applying thermal shock, the insertion loss values measured are shown in detail. The insertion loss of the conventional etalon filter is about 5.7 to 6.5 dB, but the insertion loss of the first etalon filter 230 is about 0.75 to 1.1 dB, so it can be seen that the insertion loss is remarkably reduced.

Further, a change in the accommodation state of the liquid crystal 370 according to a change in the external environment such as thermal shock may also be confirmed. In the conventional etalon filter, the accommodation state of the liquid crystal 370 is affected in the entire liquid crystal accommodating space, but in the first etalon filter 230, a part of the liquid crystal 370 accommodated in the sub accommodating space 540 moves to the main accommodating space 530 according to changes in the external environment, thereby minimizing the change in the accommodation state of the liquid crystal 370 in the main accommodating space 530.

Figure 7:
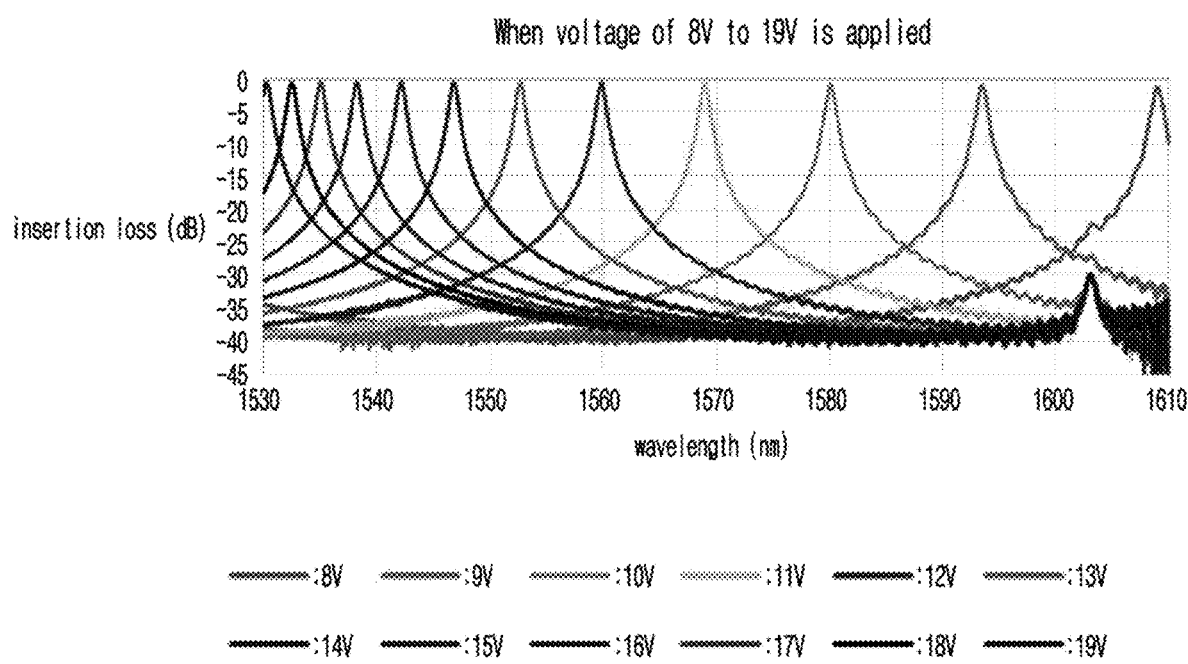
FIG. 7 is a graph showing a transmission spectrum of a wavelength tunable liquid crystal etalon filter according to the present disclosure.

FIG. 7 is a graph showing a transmission spectrum of a wavelength tunable liquid crystal etalon filter according to the present disclosure.

Referring to FIG. 7, the transmission spectrum is shown when the voltage of the first etalon filter 230 is adjusted by 1 V from 8 to 19 V, and it can be seen that the laser of a desired wavelength can be filtered according to the voltage.

FIGS. 8 and 9 are views showing a modified example of seal lines in a wavelength tunable liquid crystal etalon filter according to the present disclosure.

Figure 8A:
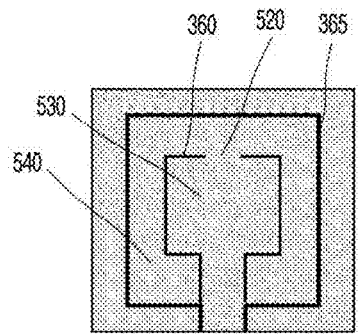
FIGS. 8A, 8B, 8C, 9A, 9B, 9C, and 9D are views showing a modified example of seal lines in a wavelength tunable liquid crystal etalon filter according to the present disclosure.

Referring to FIG. 8A, the shape of the main accommodating space 530 of the inner seal line 360 is not necessarily limited to a circular shape as shown in FIG. 3. It may be implemented in any shape as long as it does not shield the area L through which laser light is incident or passed. As shown in FIG. 8A, it may be implemented in various shapes such as a square shape.

Figure 8B:
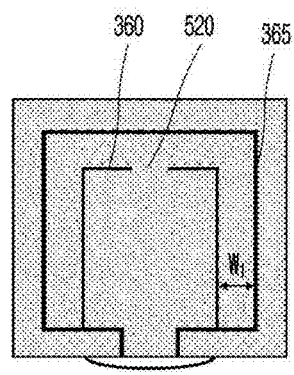

Meanwhile, when the shape of the main accommodating space 530 of the inner seal line 360 is implemented in a rectangular shape, one open part of the external seal line 365 may contact a position of the injection space (of the inner seal line 360) as shown in FIG. 8A or may contact the boundary between the injection space (of the inner seal line 360) and the main accommodating space 530 as shown in FIG. 8B. In the case of FIG. 8A, the distance between the external seal line 365 and the injection space differs the distance between the external seal line 365 and the inner seal line 360, and a bottleneck structure is formed in the sub accommodating space 540. In the case of FIG. 8B, the distance between the external seal line 365 and the injection space is the same as the distance between the external seal line 365 and the inner seal line 360, and a bottleneck structure may not be formed in the sub accommodating space 540.

Figure 8C:
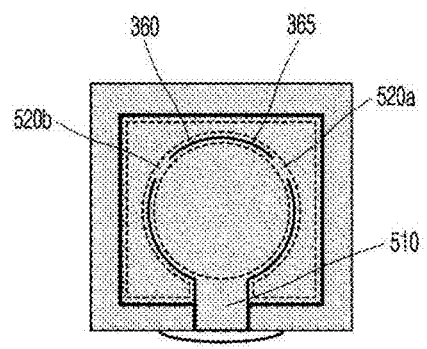

As shown in FIG. 8C, a plurality of sub inlets 520 of the inner seal line 360 may be formed. and one sub inlet is not necessarily formed. When a plurality of sub inlets 520 are formed, the liquid crystal 370 can be more smoothly accommodated from the main accommodating space 530 to the sub accommodating space 540. In order to prevent gas from remaining in the main accommodating space 530, the sub inlet 520 is preferably formed within a predetermined distance based on the farthest position from the main inlet 510. For example, referring to FIG. 8C, if the farthest position from the main inlet 510 is defined as the 12 o'clock direction, the sub inlet 520 may be formed at 10 o'clock to 12 o'clock and 12 o'clock to 2 o'clock.

Meanwhile, as shown in FIG. 9, each seal line may further include a guide part 910, and the etalon filter 230 may further include an auxiliary seal line 930 in addition to the inner seal line 360 and the external seal line 365.

Figure 9A:
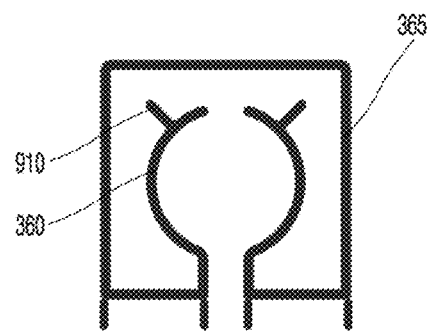

As shown in FIG. 9A, the inner seal line 360 may include a guide part 910 in an outward direction of the main accommodating space. In particular, one end of the guide part 910 facing the outside of the main accommodating space may be formed to face a corner portion of the external seal line 365. When the liquid crystal 370 is injected, the gas passes through the main accommodating space 520 and the sub accommodating space 530 and is directed toward the gas accommodating space 550. In some cases, gases form one large mass and move, but in some cases, they are divided into several masses and move individually. In the latter case, the gas mass with a relatively small volume moves toward the gas accommodating space 550 relatively quickly, but the gas mass with a relatively large volume moves toward the gas accommodating space 550 relatively slowly At this time, when a gas mass with a relatively small volume moves to a corner portion of the external seal line 365, it may be trapped in the corresponding portion and not move. When this situation occurs, as described above, the liquid crystal 370 moves from the sub accommodating space 540 to the main accommodating space 530, and the liquid crystal 370 moves along with the gas mass trapped in the corner portion.

The guide part 910 prevents a gas mass, in particular, a gas mass with a relatively small volume from being trapped and fixed at the corner portion. When a gas mass with a relatively small volume moves relatively quickly and is confined to the corner portion, a gas mass with a relatively large volume passes through the guide part 910 and then moves toward the corner (the space where the gas mass is confined). The gas mass with a relatively large volume moves toward the corner portion by the guide part 910 and moves to the gas accommodating space 550 together with the gas mass trapped in the corresponding space.

One end of the guide part 920 is formed to face a position where the gas mass is structurally trapped and cannot move, preventing the gas mass from being structurally trapped and unable to move to the gas accommodating space 550.

Figure 9B:
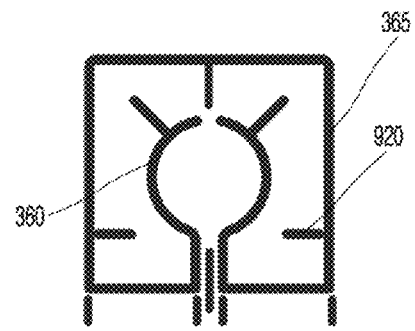
Figure 9C:
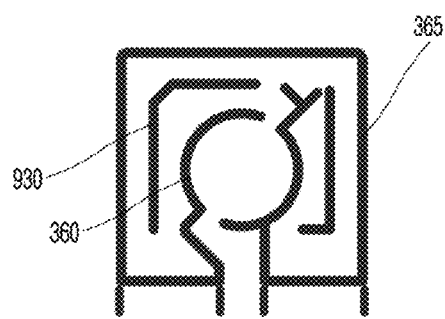
Figure 9D:
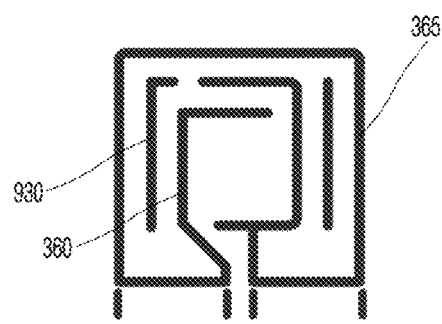

As shown in FIG. 9B, one end of the guide part 920 may be formed from the external seal line 365 toward the bottleneck structure portion (of the sub accommodating space). The guide portion 920 is formed at the corresponding portion to prevent gas disposed in the gas accommodating space 550 from re-introducing into the main accommodating space.

Additionally, the guide part 930 may be formed near the main inlet 510 (near the injection space) or in the vicinity of the sub inlet 520. As the guide part 930 is formed at the corresponding position, the seal lines 360 and 365 may assist to maintain the gap between the substrates 310 or the high reflection layers 330 more smoothly without interfering with the movement of the gas.

In order to perform a role similar to that of the guide part 930, an auxiliary seal line 930 may be disposed in the sub accommodating space 540 or between the inner seal line 360 and the external seal line 365.

Figure 10:
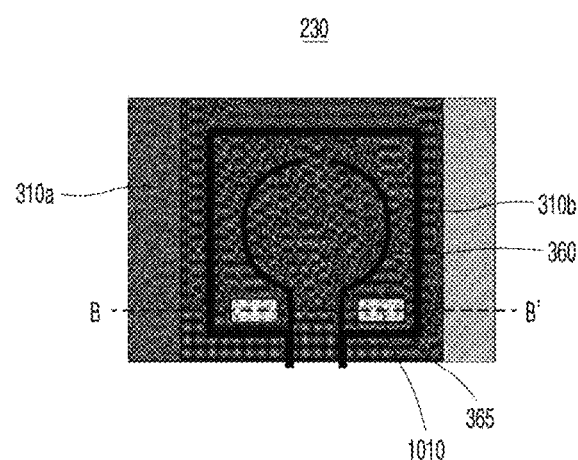
FIG. 10 is a plan view of a wavelength tunable liquid crystal etalon filter according to a second embodiment of the present disclosure.
Figure 11:
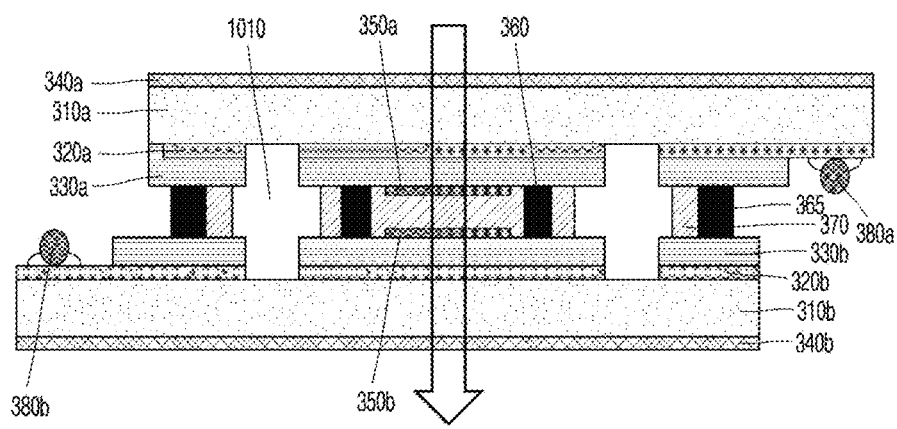
FIG. 11 is a cross-sectional view of a wavelength tunable liquid crystal etalon filter according to a second embodiment of the present disclosure.

FIG. 10 is a plan view of a wavelength tunable liquid crystal etalon filter according to a second embodiment of the present disclosure, FIG. 11 is a cross-sectional view of a wavelength tunable liquid crystal etalon filter according to a second embodiment of the present disclosure, and FIG. 12 is a view showing a modified example of a wavelength tunable liquid crystal etalon filter according to a second embodiment of the present disclosure.

Referring to FIGS. 10, 11, and 12, the wavelength tunable liquid crystal etalon filter (230, hereinafter abbreviated as 'second etalon filter') according to the second embodiment of the present disclosure further includes a non-liquid crystal chamber 1010 in addition to the structure of the first etalon filter 230.

The non-liquid crystal chamber 1010 is formed in a portion of the gas accommodating space, minimizing the movement (to the outside) of the gas that has moved into itself.

Figure 12A:
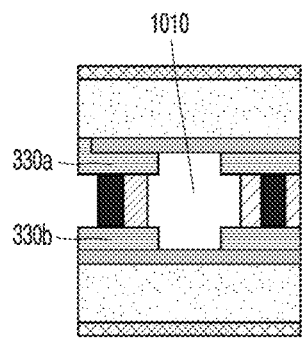
FIGS. 12A, 12B, and 12C are views showing a modified example of a wavelength tunable liquid crystal etalon filter according to a second embodiment of the present disclosure.
Figure 12B:
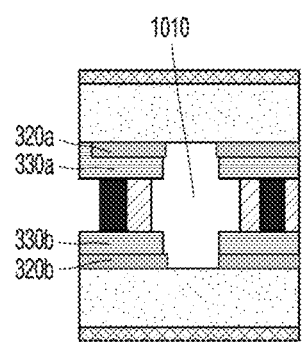
Figure 12C:
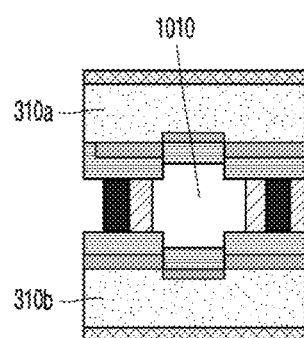

As shown in FIG. 11, the non-liquid crystal chamber 1010 has a relatively wide interval compared to the periphery. That is, the liquid crystal chamber 1010 is formed by etching the high reflection layer 330 at the position where the liquid crystal chamber 1010 is to be formed, as shown in FIG. 12A, both the transparent electrode 320 and the high reflection layer 330 at the corresponding position, as shown in FIG. 12B, or the substrate 310 to a certain depth at the corresponding position, as shown in FIG. 12C. However, it is not necessarily limited thereto, and the case of FIG. 12A or FIG. 12B and the case of FIG. 12C may be applied to the non-liquid crystal chamber 1010 together. Further, a significant result may be obtained although a non-liquid crystal chamber is implemented by introducing a structure having a different depth on only one of the two substrates.

Since the non-liquid crystal chamber 1010 has a relatively wide spacing compared to the peripheral portion, the non-liquid crystal chamber 1010 and the peripheral portion have a step difference. Accordingly, it may be difficult for the gas flowing into the non-liquid crystal chamber 1010 to flow out of the non-liquid crystal chamber 1010 again.

In addition, the gas and the liquid crystal have properties of reducing the interface area between them to reduce the surface energy. Accordingly, the gas has a tendency not to leave the non-liquid crystal room 1010 where contact with the liquid crystal can be minimized.

Accordingly, the second etalon filter 230 may retain most of the gas in the non-liquid crystal chamber 1010 even when any external force or change in the external environment occurs.

Figure 13:
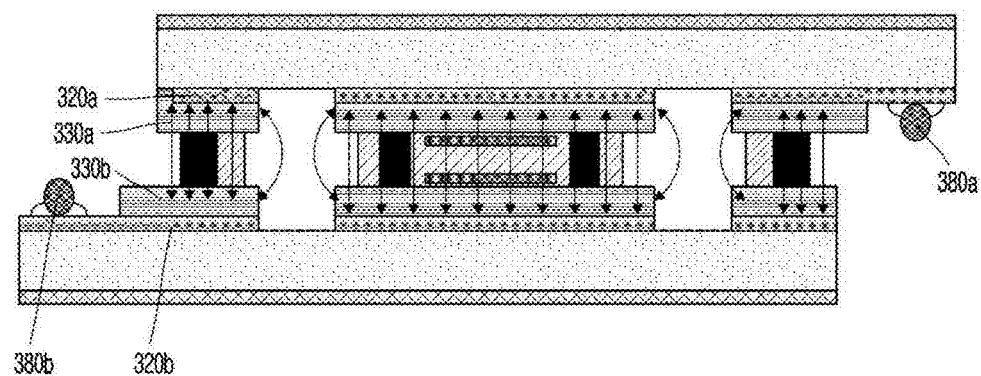
FIG. 13 is a view illustrating an electric field formed when power is applied to a wavelength tunable liquid crystal etalon filter according to a second embodiment of the present disclosure.

FIG. 13 is a view illustrating an electric field formed when power is applied to a wavelength tunable liquid crystal etalon filter according to a second embodiment of the present disclosure.

In the non-liquid crystal chamber 1010, in particular, the non-liquid crystal chamber 1010 formed by etching the transparent electrode 320 as shown in FIG. 12B, the intensity of the electric field is significantly lower than that of the periphery as shown in FIG. 13. In general, vacuum or gas has a dielectric constant of 1, whereas liquid crystal has a value at least several to several tens of times greater than the value. Therefore, when power is applied to the second etalon filter 230 and an electric field is formed, the liquid crystal having a large dielectric constant tends to move to a region where the electric field is large, and the vacuum or gas tends to be pushed into the non-liquid crystal chamber 1010 where the electric field is weak.

Accordingly, when power is supplied to the transparent electrode 320 and an electric field is formed, the gas introduced into the non-liquid crystal chamber 1010 may not leave the non-liquid crystal chamber 1010 anymore. This is supported in FIG. 14.

Figure 14:
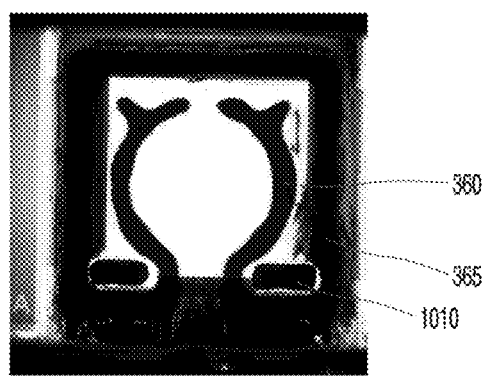
FIG. 14 is a view showing a state after liquid crystal is injected into a wavelength tunable liquid crystal etalon filter according to a second embodiment of the present disclosure.

FIG. 14 is a view showing a state after liquid crystal is injected into a wavelength tunable liquid crystal etalon filter according to a second embodiment of the present disclosure.

FIG. 14 is a view when the second etalon filter 130 disposed between two sheets of orthogonal polarizing plates is observed on a backlight. The part where the liquid crystal exists is observed brightly due to the birefringence effect of the liquid crystal. Referring to FIG. 14, it can be confirmed that the non-liquid crystal chamber 1010 is dark in the second etalon filter 130 because no liquid crystal exists.

Figure 15:
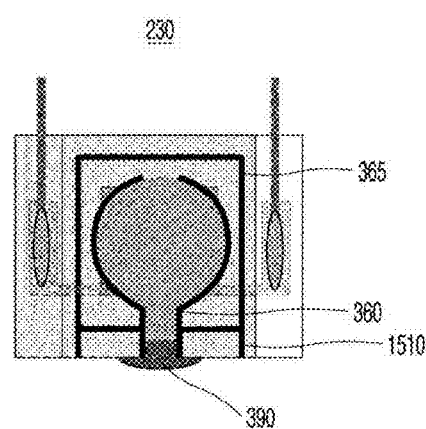
FIG. 15 is a plan view of a wavelength tunable liquid crystal etalon filter according to a third embodiment of the present disclosure.

FIG. 15 is a plan view of a wavelength tunable liquid crystal etalon filter according to a third embodiment of the present disclosure, FIG. 16 is a view illustrating a process of processing a wavelength tunable liquid crystal etalon filter according to a third embodiment of the present disclosure, and FIG. 17 is a view showing a state in which a wavelength tunable liquid crystal etalon filter according to the present disclosure and a conventional etalon filter are finally sealed.

Referring to FIGS. 15 and 16, the wavelength tunable liquid crystal etalon filter (230, hereinafter abbreviated as 'third etalon filter') according to the third embodiment of the present disclosure further includes an additional seal line 1510 in the first etalon filter 230.

When all of the liquid crystal 370 is injected into the etalon filter 230, the encapsulant 390 is injected into the vicinity of the main inlet 510 so that the liquid crystal is not discharged from the inside of the etalon filter 230 to the outside after the liquid crystal is injected. Thereafter, through a curing process such as UV curing, sealing of the main inlet 510 is completed. However, in this case, it is difficult to inject an amount that the encapsulant 390 can block only the entrance of the main inlet 510. Moreover, it is difficult to inject and harden only the amount of the encapsulant 390 in an uncured state. Therefore, the encapsulant 390 of the above-described amount or more is typically injected.

Figure 16A:
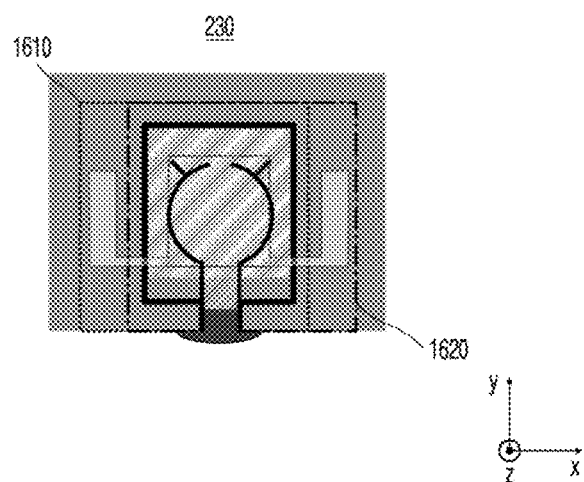
FIGS. 16A and 16B are views illustrating a process of processing a wavelength tunable liquid crystal etalon filter according to a third embodiment of the present disclosure.
Figure 16B:
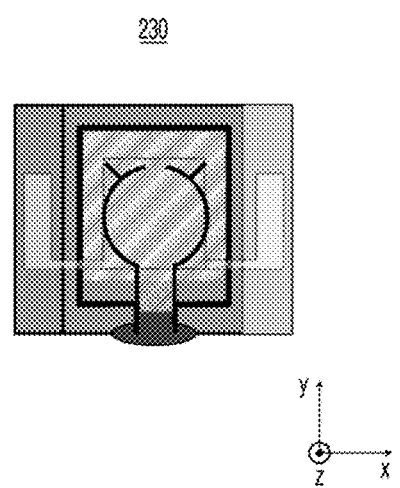

Meanwhile, in the manufacturing process of the etalon filter 230, it is significantly difficult to manufacture the etalon filter 230 so that each layer in the etalon filter 230 has exactly the area it should have. Accordingly, when the etalon filter 230 to be finally manufactured has the shape or area of FIG. 16B, the etalon filter 230 generally just manufactured by the manufacturing process may have the shape or area of FIG. 16A. As shown in FIG. 16A, the just-manufactured etalon filter 230 undergoes a separate process such as dicing. One side is cut according to the first cutting surface 1610 and the other side is cut according to the second cutting surface 1620. Accordingly, the etalon filter 230 has a final shape as shown in FIG. 16B.

Figure 17A:
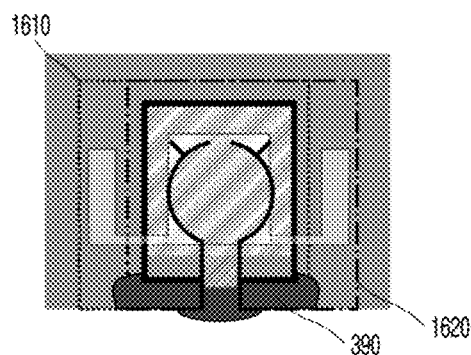
FIGS. 17A and 17B are views showing a state in which a wavelength tunable liquid crystal etalon filter according to the present disclosure and a conventional etalon filter are finally sealed.

In injecting and curing the encapsulant 390 as a final step of the manufacturing process, a conventional etalon filter without an additional seal line 1510 causes a phenomenon as shown in FIG. 17A. As described above, since a certain amount or more of the encapsulant 390 must be injected, the encapsulant 390 is finally hardened while invading the area of the first cutting surface 1610 or the second cutting surface

1620. When the encapsulant 390 is cured beyond the cutting surfaces 1610 and 1620, processing of the etalon filter 230 is significantly difficult to significantly reducing durability of the processing apparatus.

Figure 17B:
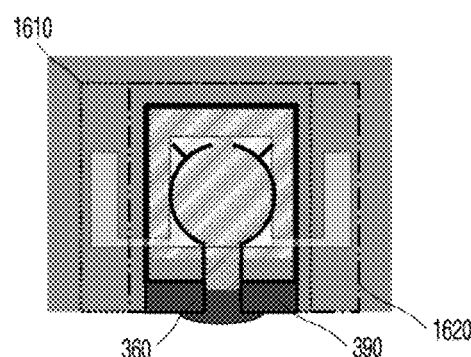

In order to address this issue, in the processing of the etalon filter 230, the third etalon filter 230 includes an additional seal line 1510. The additional seal line 1510 protrudes from any point within a predetermined radius based on the main inlet 510 of the external seal line 365 to the outside of the external seal line 365 (opposite side of the sub inlet). At this time, the additional seal line 1510 is formed by protruding within an area that does not invade each of the cutting surfaces 1610 and 1620. The third etalon filter 230 includes the additional seal line 1510, and as shown in FIG. 17B, the injected encapsulant remains only within the additional seal line 1510, preventing diffusion. The encapsulant 390 is cured within the additional seal line 1510, so that the area of each cutting surface 1610 and 1620 may not be invaded. Therefore, it is possible to prevent processing problems of the encapsulant 390 and the etalon filter that occur in the conventional etalon filter manufacturing process.

Figure 18:
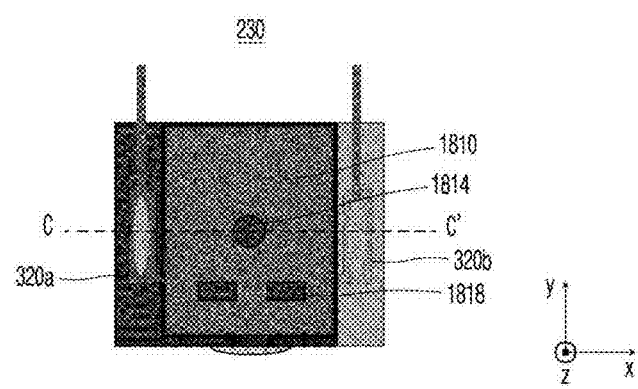
FIG. 18 is a plan view of a wavelength tunable liquid crystal etalon filter according to a fourth embodiment of the present disclosure.
Figure 19:
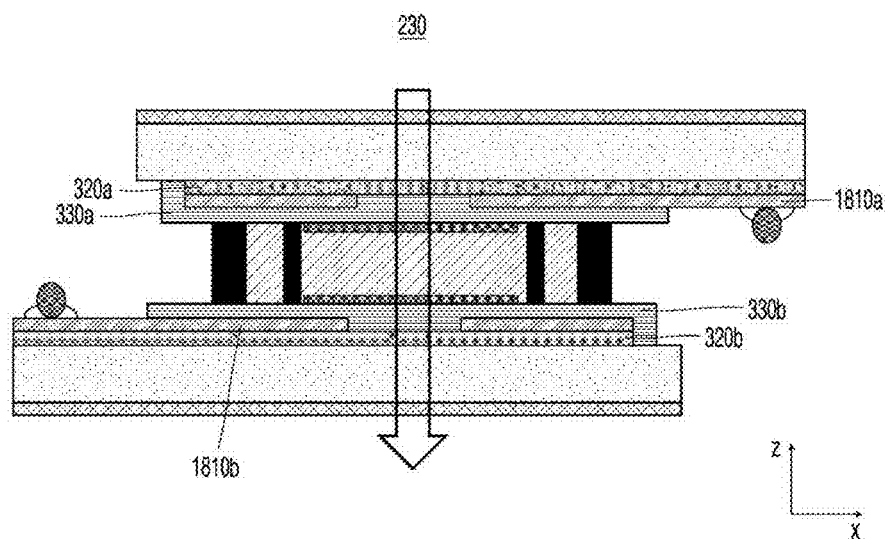
FIG. 19 is a cross-sectional view of a wavelength tunable liquid crystal etalon filter according to a fourth embodiment of the present disclosure.
Figure 20:
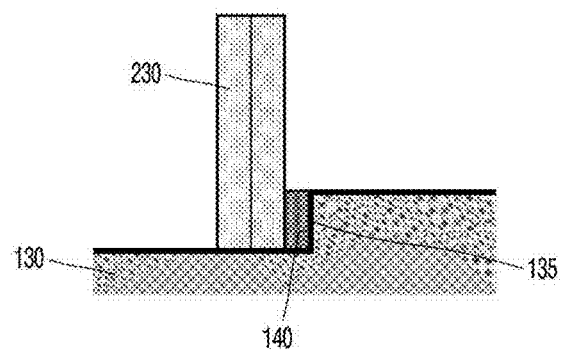
FIG. 20 is a view showing a state in which a wavelength tunable liquid crystal etalon filter according to the present disclosure is installed in a device requiring a filter.

FIG. 18 is a plan view of a wavelength tunable liquid crystal etalon filter according to a fourth embodiment of the present disclosure, FIG. 19 is a cross-sectional view of a wavelength tunable liquid crystal etalon filter according to a fourth embodiment of the present disclosure, and FIG. 20 is a view showing a state in which a wavelength tunable liquid crystal etalon filter according to the present disclosure is installed in a device requiring a filter.

Referring to FIGS. 18, 19, and 20, the wavelength tunable liquid crystal etalon filter (230, hereinafter abbreviated as 'fourth etalon filter') according to the fourth embodiment of the present disclosure further includes a metal electrode 1810 in the first etalon filter 230.

The etalon filter 230 is disposed in various devices such as the optical transceiver 100 in the same manner as shown in FIG. 20. Referring to FIG. 20, the etalon filter 230 is disposed at a predetermined position of the submount 130 in the optical transceiver 100, and then adhered and fixed to the position of the submount 130 by an adhesive 140. At this time, the commonly used adhesive 140 is a UV curing adhesive. After the adhesive is applied, UV light in a wavelength band of about 360 nm is irradiated to cure the adhesive 140. In order to shorten the adhesion time, UV light with a strong intensity of 200 mW or more is typically irradiated. However, when UV light having such strong intensity is irradiated to the etalon filter 130, particularly the seal lines 360 and 365 or the liquid crystal 370, material (sealant) constituting the seal lines 360 and 365 is material of liquid crystal 370 damaged by UV light. In particular, the material constituting the seal lines 360 and 365 is easily deteriorated by UV light to deteriorate the etalon properties.

To prevent this, the fourth etalon filter 230 further includes a metal electrode 1810. The metal electrode 1810 is disposed on the transparent electrode 320 to prevent UV light irradiated for curing the adhesive 140 from being incident into the fourth etalon filter 230. The metal electrode 1810 is made of a material that does not transmit light, in particular, light in the UV wavelength band, and prevents UV light from being incident from the outside to the inside of the fourth etalon filter 230.

Further, the metal electrode 1810 may enhance an electric field formed by the transparent electrode 320. The transparent electrode 320 has a property of partially absorbing light. Therefore, it is difficult to implement the transparent electrode 320 with an excessively thick thickness. However, when the transparent electrode 320 is implemented with a thin thickness, the electrical conductivity is low, and when the transparent electrode 320 receives power from the outside to form an electric field, it may form an electric field with relatively weak intensity. The metal electrode 1810 is disposed adjacent to the transparent electrode 320, thereby enhancing the intensity of the to-be-formed electric field.

As described above, the metal electrode 1810 is made of a material that does not transmit light. Accordingly, it may affect the incidence or passage of light into the etalon filter 230. To prevent this issue, the metal electrode 1810 includes a laser transmission hole 1814. The laser transmission hole 1814 is hollow formed by a predetermined radius around the area L through which laser light is incident or passes. In order to separate light of a specific wavelength band, the laser transmission hole 1814 allows laser light incident to the etalon filter 230 or light filtered from the etalon filter 230 to pass through.

Meanwhile, additional etching may be performed at the position of the non-liquid crystal chamber 1010 within the metal electrode 1810. The metal electrode 1810 is also etched at a corresponding position to form the liquid crystal chamber 1010. that is, the high reflection layer 330 and the metal electrode 1810 are etched together to form the non-liquid crystal chamber 1010, and the high reflection layer 330, the metal electrode 1810 and the transparent electrode 320 are all etched to form a non-liquid crystal chamber 1010.

The metal electrode 1810 may be disposed on the transparent electrode 320, but is not limited thereto. The metal electrode 1810 may be disposed at various positions on one surface of the substrate 310 in a direction in which the two substrates 310 face each other. Various modifications of the fourth etalon filter 230 are shown in FIG. 21.

FIG. 21 is a view showing a modified example of a wavelength tunable liquid crystal etalon filter according to a fourth embodiment of the present disclosure;

FIG. 21 shows only the structure of one substrate 310b of the etalon filter 230.

Figure 21A:
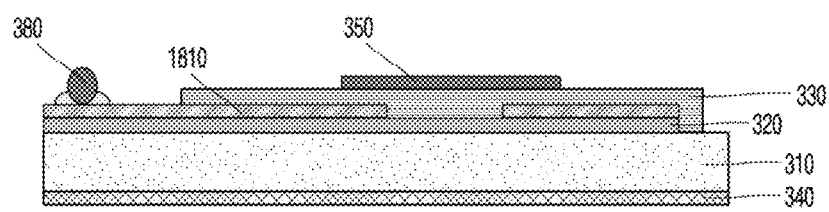
FIGS. 21A, 21B, 21C, and 21D are views showing a modified example of a wavelength tunable liquid crystal etalon filter according to a fourth embodiment of the present disclosure.
Figure 21B:
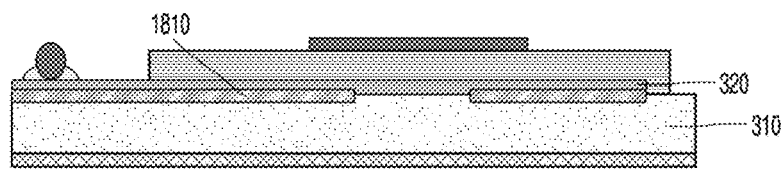

The metal electrode 1810 may be disposed on the transparent electrode 320 as shown in FIG. 21A but may also be disposed between the substrate 310 and the transparent electrode 320 as shown in FIG. 21B.

Further, the high reflection layer 330 may be disposed on the substrate 310 of the etalon filter 230 and the transparent electrode 320 may be disposed on the high reflection layer 330.

Figure 21C:
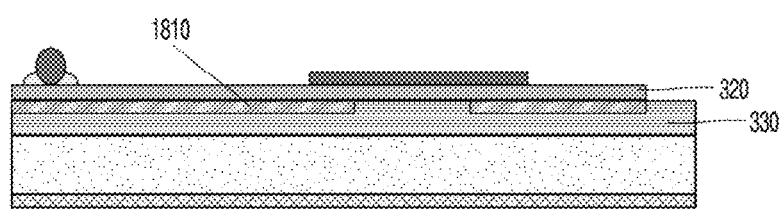
Figure 21D:
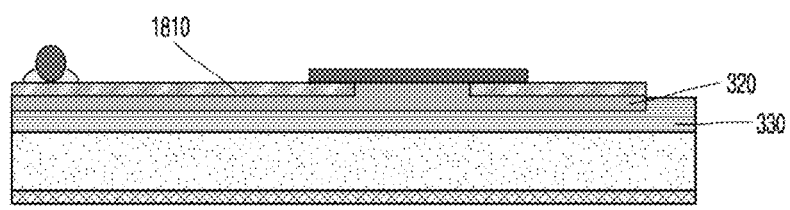

In this case, the metal electrode 1810 may be disposed between the high reflection layer 330 and the transparent electrode 320 as shown in FIG. 21C or may be disposed on the transparent electrode 320 as shown in FIG. 21D. As such, the metal electrode 1810 may be disposed at any position as long as it is one surface of the substrate 310 in a direction in which the respective substrates 310 face each other.

However, in order to increase the blocking efficiency of UV light entering the seal lines 360 and 365 and the liquid crystal 370, the metal electrode 1810 is preferably disposed close to the seal lines 360 and 365. The metal electrode 1810 should be disposed close to the seal lines 360 and 365 to block more UV light incidents from the side.

Accordingly, the blocking efficiency of UV light is higher in FIG. 21A than in FIG. 21B, and higher in FIGS. 21C and 21D than in FIGS. 21A and 21B.

Figure 22:
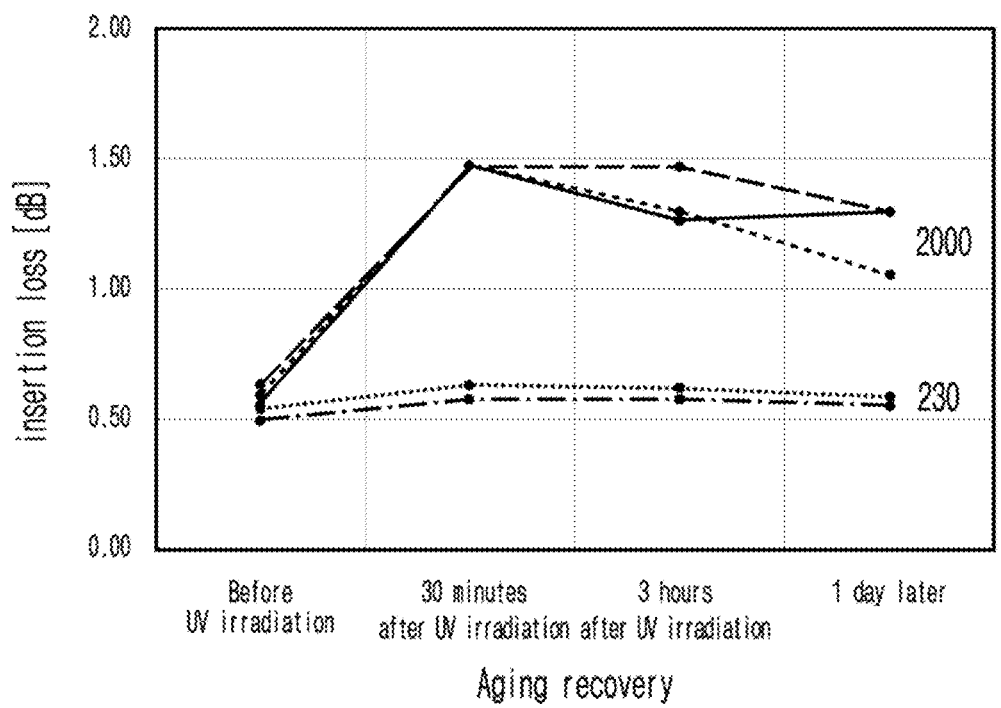
FIG. 22 is a graph showing insertion loss according to UV irradiation time of a wavelength tunable liquid crystal etalon filter according to a fourth embodiment of the present disclosure and a conventional etalon filter.
Figure 23A:
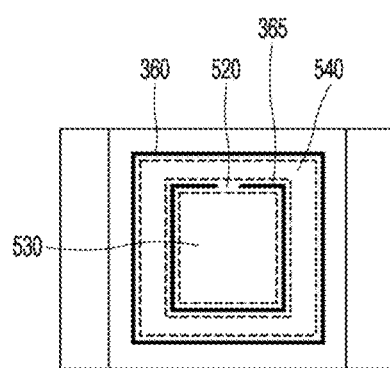
FIGS. 23A, 23B, 23C, and 23D are plan views of a wavelength tunable liquid crystal etalon filter according to a fifth embodiment of the present disclosure.
Figure 23B:
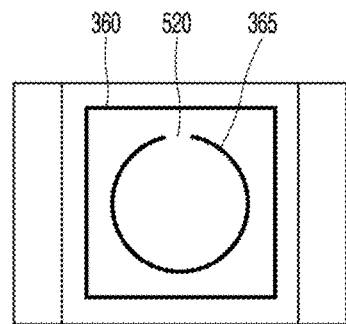
Figure 23C:
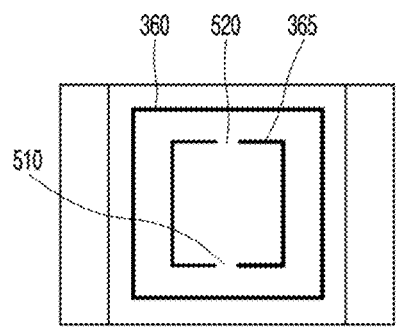
Figure 23D:
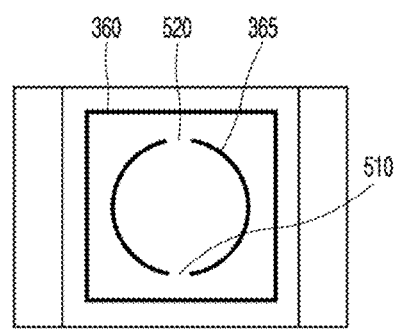

In this way, the fourth etalon filter 230 includes the metal electrode 1810, preventing a decrease in insertion loss due to UV light, which is supported by FIG. 22.

FIG. 22 is a graph showing insertion loss according to UV irradiation time of a wavelength tunable liquid crystal etalon filter according to a fourth embodiment of the present disclosure and a conventional etalon filter.

Referring to FIG. 22, it can be confirmed that the insertion loss of the conventional etalon filter (2000) was increased from 0.5 dB to 1.5 dB by comparing before and after UV irradiation. It can be confirmed that even one day after UV irradiation, the insertion loss did not significantly drop compared to that immediately after UV irradiation.

On the other hand, it can be confirmed that the insertion loss of the fourth etalon filter 230 hardly changes even when comparing before and after UV irradiation.

Figure 24:
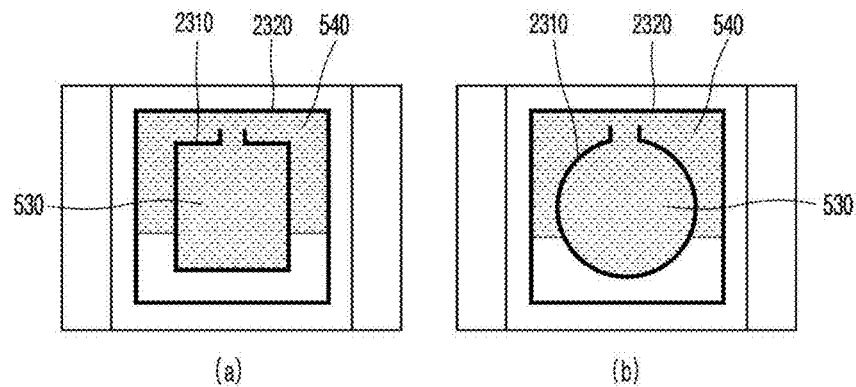
FIG. 24 is a view illustrating a process of injecting liquid crystal into a wavelength tunable liquid crystal etalon filter according to a fifth embodiment of the present disclosure.

FIG. 23 is a plan view of a wavelength tunable liquid crystal etalon filter according to a fifth embodiment of the present disclosure, and FIG. 24 is a view illustrating a process of injecting liquid crystal into a wavelength tunable liquid crystal etalon filter according to a fifth embodiment of the present disclosure.

Referring to FIGS. 23 and 24, the wavelength tunable liquid crystal etalon filter (230, hereinafter abbreviated as 'fifth etalon filter') according to the fifth embodiment of the present disclosure further includes an inner seal line 2310 in the first etalon filter 230.

Unlike the first to fourth etalon filters 230, the fifth etalon filter 230 may be created by dropping the liquid crystal 370 instead of injecting it. A predetermined amount of liquid crystal 370 is dripped in a state where the seal lines 2310 and 2320 are disposed on the specific substrates (one of 310a and 310b), and the other substrate (other of 310a and 310b) is brought into close contact with the corresponding substrate to fix both substrates.

Since the liquid crystal 370 is injected in a dropwise manner, the inner seal line 2310 does not include a main inlet unlike the inner seal line 360, but only includes a sub inlet 520.

Meanwhile, unlike the external seal line 365, the external seal line 2320 forms a closed path without an open portion, thereby preventing the dropped liquid crystal 370 from leaking out.

The respective seal lines 2310 and 2320 include the above-described structure, so the dropped liquid crystal 370 first fills the main accommodating space 530 as in the case of the first to fourth etalon filters 230, and then flows into the sub accommodating space by passing through the sub inlet 520.

Likewise, liquid crystal 370 is dropped in an amount sufficient to form gas therein, so that the fifth etalon filter 230 contains gas therein like the first to fourth etalon filters 230.

Meanwhile, the fifth etalon filter 230 may include a modified example as shown in FIG. 25.

FIG. 25 is a view showing a modified example of a wavelength tunable liquid crystal etalon filter according to a fifth embodiment of the present disclosure.

Figure 25A:
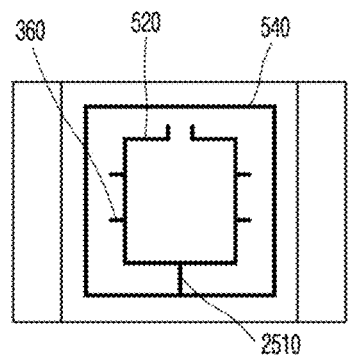
FIGS. 25A, 25B, 25C, and 25D are views showing a modified example of a wavelength tunable liquid crystal etalon filter according to a fifth embodiment of the present disclosure.
Figure 25B:
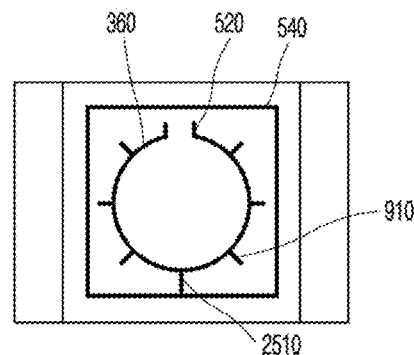

As shown in FIGS. 25A and 25B, the inner seal line 2310 may also be implemented in various shapes. Further, the inner seal line 2310 may similarly include a guide part 910 so that the gas smoothly moves to the position of the gas receiving space and may further include a partition wall 2510 protruding from a position farthest from the sub inlet 420 of the inner seal line 2310 to the external seal line 2320. The partition wall 2510 is formed to prevent liquid crystal 370 from flowing within the sub accommodating space 540 with the partition wall 2510 as a boundary.

Figure 25C:
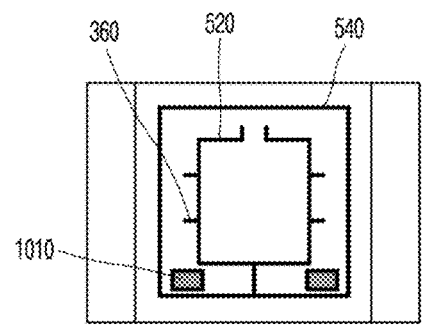
Figure 25D:
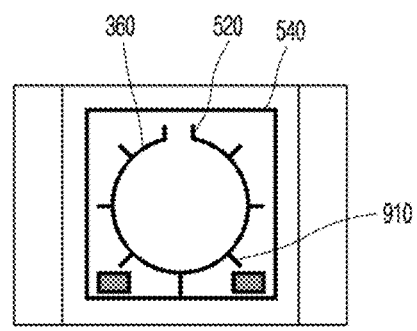

Further, as shown in FIGS. 25C and 25D, the fifth etalon filter 230 may include a non-liquid crystal chamber 1010.

The above description is only an example of the technical idea of the present embodiment, and various modifications and variations can be made to those skilled in the art without departing from the essential properties of the present embodiment. Therefore, the present embodiments are not intended to limit the technical idea of the present embodiment, but to explain, and the scope of the technical idea of the present embodiment is not limited by these embodiments. The scope of protection of this embodiment should be interpreted according to the claims below, and all technical ideas within the scope equivalent thereto should be construed as being included in the scope of rights of this embodiment.

What is claimed is:

1. A wavelength tunable etalon filter through which only incident light with a predetermined wavelength band is transmitted among incident light, wherein the wavelength tunable etalon filter comprises:
   a pair of substrates;
   a pair of high reflection layers;
   liquid crystal configured to be injected between the pair of substrates;
   an internal seal line configured to be formed between the pair of substrates to maintain a gap between the pair of substrates or the pair of high reflection layers, have a sub inlet through which the liquid crystal is discharged, and have a main accommodating space configured to have a predetermined shape around an area L-through which light is incident or passed;
   an external seal line configured to be formed between the pair of substrates, have a predetermined shape, and is positioned outside the internal seal line to form a sub accommodating space outside the internal seal line; and
   an encapsulant configured to seal the main accommodating space to prevent discharge of the liquid crystal,
   wherein a gas accommodating space in which gas exists is formed in the sub accommodating space, and the gas accommodating space includes a non-liquid crystal chamber having a relatively wider width than an area adjacent to the non-liquid crystal chamber at a predetermined location and having a step difference from a peripheral portion, thereby minimizing re-discharge of gas introduced into the sub accommodating space to outside of the sub accommodating space.

2. The wavelength tunable etalon filter of claim 1, wherein the internal seal line further comprises a main inlet through which the liquid crystal is introduced.

3. The wavelength tunable etalon filter of claim 2, wherein the encapsulant is injected into the main inlet and cured, thereby sealing the main inlet.

4. The wavelength tunable etalon filter of claim 2, wherein the sub inlet is formed on the farthest position from the main inlet.

5. The wavelength tunable etalon filter of claim 2, wherein a plurality of sub inlets is formed.

6. The wavelength tunable etalon filter of claim 5, wherein the plurality of the sub inlet is formed within a predetermined distance based on the farthest position from the main inlet.

7. The wavelength tunable etalon filter of claim 1, wherein the liquid crystal is dropped onto one substrate and disposed between both substrates.

8. The wavelength tunable etalon filter of claim 1, further comprising:
   a pair of transparent electrodes, each transparent electrode being disposed on one surface of each substrate in a direction facing each other to receive power from the outside, thereby forming an electric field;

the pair of high reflection layers, each high reflection layer being disposed on one surface of each transparent electrode or each substrate in a direction facing each other to reflect light incident toward each high reflection layer; and a pair of alignment layers configured to be disposed on the high reflection layer to orient the liquid crystal.

9. The wavelength tunable etalon filter of claim 8, further comprising:

a metal electrode configured to be positioned between the pair of substrates and the internal seal line and the external seal line, made of a material that does not transmit light and including a transmission hole so that light for filtering or filtered light is passed through the transmission hole and light with a wavelength band which is able to damage the liquid crystal and the seal line is blocked.

10. The wavelength tunable etalon filter of claim 9, wherein the metal electrode is disposed on the pair of high reflection layers.

11. The wavelength tunable etalon filter of claim 10, wherein the pair of transparent electrodes is are disposed on the pair of high reflection layers.

12. The wavelength tunable etalon filter of claim 11, wherein the metal electrode is disposed between the pair of transparent electrodes and the pair of high reflection layers.

13. The wavelength tunable etalon filter of claim 11, wherein the metal electrode is disposed on the pair of transparent electrodes.

14. The wavelength tunable etalon filter of claim 9, wherein the metal electrode is disposed between the pair of substrates and the pair of high reflection layers.

15. The wavelength tunable etalon filter of claim 9, wherein the metal electrode blocks light with a UV wavelength band.

16. The wavelength tunable etalon filter of claim 8, wherein the non-liquid crystal chamber is formed by etching some or all of the pair of substrates, the pair of high reflection layers and the pair of transparent electrodes.

17. The wavelength tunable etalon filter of claim 16, wherein the non-liquid crystal chamber is formed by etching some or all of the pair of substrates, the pair of high reflection layers, and the pair of transparent electrodes by a predetermined depth on an axis formed by directions in which the pair of substrates face each other.

18. The wavelength tunable etalon filter of claim 1, further comprising:

an additional seal line configured to protrude from any point within a predetermined radius based on the main inlet of the internal seal line to the outside of the external seal line.

* * * * *